(12) United States Patent
Su

(10) Patent No.: US 8,391,427 B2
(45) Date of Patent: Mar. 5, 2013

(54) CHANNEL ESTIMATION METHODS AND APPARATUS UTILIZING THE SAME

(75) Inventor: Pengcheng Su, San Diego, CA (US)

(73) Assignee: Via Telecom, Inc., San Diego, CA (US)

( * ) Notice: Subject to any disclaimer, the term of this patent is extended or adjusted under 35 U.S.C. 154(b) by 1031 days.

(21) Appl. No.: 12/400,169

(22) Filed: Mar. 9, 2009

(65) Prior Publication Data

US 2009/0296836 A1 Dec. 3, 2009

(30) Foreign Application Priority Data

Jun. 2, 2008 (CN) .......................... 2008 1 0108784

(51) Int. Cl.
  *H04B 1/10* (2006.01)
(52) U.S. Cl. ......... 375/349; 375/260; 375/285; 375/346
(58) Field of Classification Search .......... 375/130–133, 375/136, 259–260, 285, 316, 340, 342–343, 375/346–350
See application file for complete search history.

(56) References Cited

U.S. PATENT DOCUMENTS 6,771,591 B1 * 8/2004 Belotserkovsky et al. ... 370/210
2007/0153922 A1 * 7/2007 Dong et al. .................... 375/260
2007/0230601 A1 10/2007 Yim et al.
2010/0085866 A1 * 4/2010 Li et al. .......................... 370/208
2011/0149942 A1 * 6/2011 Ko et al. ........................ 370/343

* cited by examiner

*Primary Examiner* — David C. Payne
*Assistant Examiner* — James M Perez
(74) *Attorney, Agent, or Firm* — McClure, Qualey & Rodack, LLP

(57) ABSTRACT

A channel estimation device and method for an orthogonal frequency division multiplexing (OFDM) system for receiving OFDM symbols to generate channel estimation information is provided. The channel estimation method includes: obtaining a portion of pilot signals from a plurality of pilot signals as a first pilot set according to corresponding positions of the pilot signals in the OFDM symbols; estimating a first estimation factor by calculating the pilot signals in the first pilot set in a first direction; estimating a second estimation factor by calculating the pilot signals in the first pilot set in a second direction; obtaining a pilot signal estimation result according to the first estimation factor and the second estimation factor; and obtaining the channel estimation information according to the pilot signal estimation result.

22 Claims, 11 Drawing Sheets

CHANNEL ESTIMATION METHODS AND APPARATUS UTILIZING THE SAME

CROSS REFERENCE TO RELATED APPLICATIONS

This Application claims priority of China Patent Application No. 200810108784.4, filed on Jun. 2, 2008, the entirety of which is incorporated by reference herein.

BACKGROUND OF THE INVENTION

1. Field of the Invention

The invention relates to signal receiving technology in a wireless communication system, and more particularly to a channel estimation method and device in an orthogonal frequency division multiplexing (OFDM) system.

2. Description of the Related Art

In the recent years, orthogonal frequency division multiplexing (OFDM) has been widely used due to its capability of reducing multi-path interference and high spectrum efficiency. The OFDM is capable of supporting multiple accesses for multiple users. In particular, the orthogonal frequency division multiple access (OFDMA) technique in combination with the frequency division multiple access (FDMA) technique efficiently controls the data rate of each user. Thus, channel utilization is improved. For example, in the system complying with the 802.16e standard, also known as a Worldwide Interoperability for Microwave Access (Wimax) system, the combination of OFDM and multiple in multiple out (MIMO) antenna technologies is introduced in the physical layer of the transmission protocol so as to double the transmission rate and support sufficient mobility. Such kind of system is able to provide non light of sight data transmission in the 2 GHz~11 GHz band with 20 MHz bandwidth. The data transmission rate achieves 75 Mbps with a 10 km radius coverage and mobility achieves 120 km/h.

However, in the wireless communication system, the data transmission is often affected by frequency selective fading and time variance of the channel. In a wireless terminal, channel estimation of the possible effects as described above during the data transmission is required. Specifically, at a signal receiving terminal, the channel information is required for quantization and decoding. Thus, channel estimation is a key technology for wireless data reception and process.

The Wiener filter is widely used in the current channel estimation methods to obtain channel information and filter with finite impulse response based on the tap coefficient determined by channel characteristics. Such kind of method reveals both the time variant and frequency selective fading characteristics of the channels.

However, large amount of multiplications are required when obtaining the filter coefficients of the Wiener filter. Although the complexity of an order 2 Wiener filter may be reduced, it still requires large amount of operations due to the large number of pilot sub-carriers in the frequency domain. Thus, efficiently and easily obtaining information about the Wiener filter coefficients is a key issue.

BRIEF SUMMARY OF THE INVENTION

Channel estimation devices and methods are provided. An exemplary embodiment of a channel estimation method in an orthogonal frequency division multiplexing (OFDM) system for receiving a plurality of OFDM symbols and generating channel estimation information comprises: obtaining a portion of pilot signals from a plurality of pilot signals as a first pilot set according to corresponding positions of the pilot signals in the OFDM symbols; estimating a first estimation factor by calculating the pilot signals in the first pilot set in a first direction to obtain the first estimation factor, estimating a second estimation factor by calculating the pilot signals in the first pilot set in a second direction to obtain the second estimation factor, and obtaining a pilot signal estimation result according to the first estimation factor and the second estimation factor; and obtaining the channel estimation information according to the pilot signal estimation result.

Another exemplary embodiment of a channel estimation apparatus used in an frequency division multiplexing (OFDM) system for receiving a plurality of OFDM symbols and generating channel estimation information comprises: a pilot signal selector obtaining a portion of pilot signals from a plurality of pilot signals as a first pilot set according to corresponding positions of the pilot signals in the OFDM symbols; a pilot signal estimation module coupled to the pilot signal selector for estimating a first estimation factor by calculating the pilot signals in the first pilot set in a first direction to obtain the first estimation factor; estimating a second estimation factor by calculating the pilot signals in the first pilot set in a second direction to obtain the second estimation factor, and obtaining a pilot signal estimation result according to the first estimation factor and the second estimation factor; and a channel estimation information calculator coupled to the pilot signal estimation module, obtaining the channel estimation information according to the pilot signal estimation result.

Another exemplary embodiment of a receiving apparatus used in an Orthogonal frequency division multiplexing (OFDM) system comprises a front end processing module for converting received signals to a plurality of OFDM symbols, a channel estimation device receiving the OFDM symbols and generating channel estimation information, and a back end processing module for decoding data according to the channel estimation information and the OFDM symbols.

According to the provided channel estimation devices and methods, the computation speed is greatly increased to overcome the drawbacks of current OFDM channel estimation technology.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein.

DETAILED DESCRIPTION OF THE INVENTION

The following description is of the best-contemplated mode for carrying out the invention. In the following figures and embodiments, the invention is applied as embodiments which comply with the Wimax 802.16d or 802.16e standards and each symbol comprises 1024 sub-carriers in the Wimax system. It is to be understood that the number of sub-carriers and other settings are made for the purpose of illustrating the general principles of the invention and should not be taken in a limiting sense. In addition, the invention is not limited to the Wimax system. Any other systems with the same system conditions or with the similar channel characteristics may be applied as an embodiment of the invention through the methods in the following description. The scope of the invention is best determined by reference to the appended claims.

Figure 1:
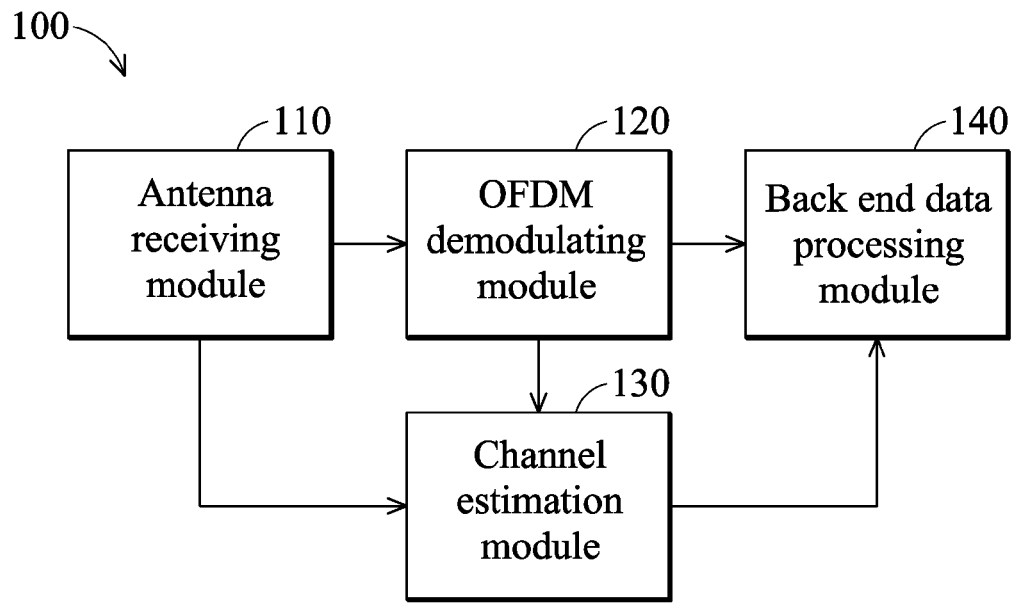
FIG. 1 shows a block of a wireless communication system according to an embodiment of the invention.

FIG. 1 shows a block of a wireless communication system, and more particular to a Wimax receiver system. Wimax system 100 comprises an antenna receiving module 110, an OFDM demodulating module 120, a channel estimation module 130 and a back end data processing module 140. In the Wimax receiver system 100, antenna receiving module 110 comprises 2 transmitting and 2 receiving antenna arrays, or comprises a single transmitting and a single receiving antenna arrays, or multiple transmitting and a single receiving antenna arrays. The antenna receiving module 110 may further comprise a means for converting radio frequency signals to baseband signals, such as an analog to digital converter (ADC), a filter . . . etc. In the Wimax receiver system, the antenna receiving module 110 outputs OFDM symbols and antenna identification information. The OFDM symbols comprise multiple sub-carriers and user data, wherein the sub-carriers may carry pilot signals and data signals. The antenna identification information identifies whether the transmitting antenna is a single antenna or not. When the transmitting antenna is a single antenna, the single antenna sign bit is set as TRUE, and when the transmitting antennas are multiple antennas, the single antenna sign bit is set as FALSE. The OFDM demodulating module 120 is coupled to the antenna receiving module 110. Fast Fourier Transform (FFT) is implemented in the OFDM demodulating module 120 to demodulate data. The decoded pilot information is passed to the channel estimation module 130 and the demodulated data information is passed to the back-end data processing module 140. The channel estimation module 130 is described in the following paragraph. The back-end data processing module 140 receives the estimation results from the channel estimation module 130 and the demodulating results from the OFDM demodulating module 120. It is to be noted that when the antenna receiving module 110 adopts multiple transmitting and multiple receiving antenna arrays, such as 2 transmitting and 2 receiving antenna arrays, the back end data processing module 140 needs to space-time decode the received data signals. When the antenna receiving module 110 adopts single transmitting and multiple receiving antenna arrays, such as 1 transmitting and 2 receiving antenna arrays, the back end data processing module 140 needs to combine the received data signals. When the antenna receiving module 110 adopts a single transmitting and a single receiving antenna array, such as 1 transmitting and 1 receiving antenna array, the back end data processing module 140 does not need to combine or space-time decode the received data signals. The back end data processing module 140 may also perform demodulation by using a Quadrature Phase Shift Keying (QPSK) or Quadrature amplitude modulation (QAM) technique, a Hybrid Automatic Repeat Request (HARQ) technique, or a de-interleave technique and channel decode the data after being decoded according to the estimated channel information.

Figure 2:
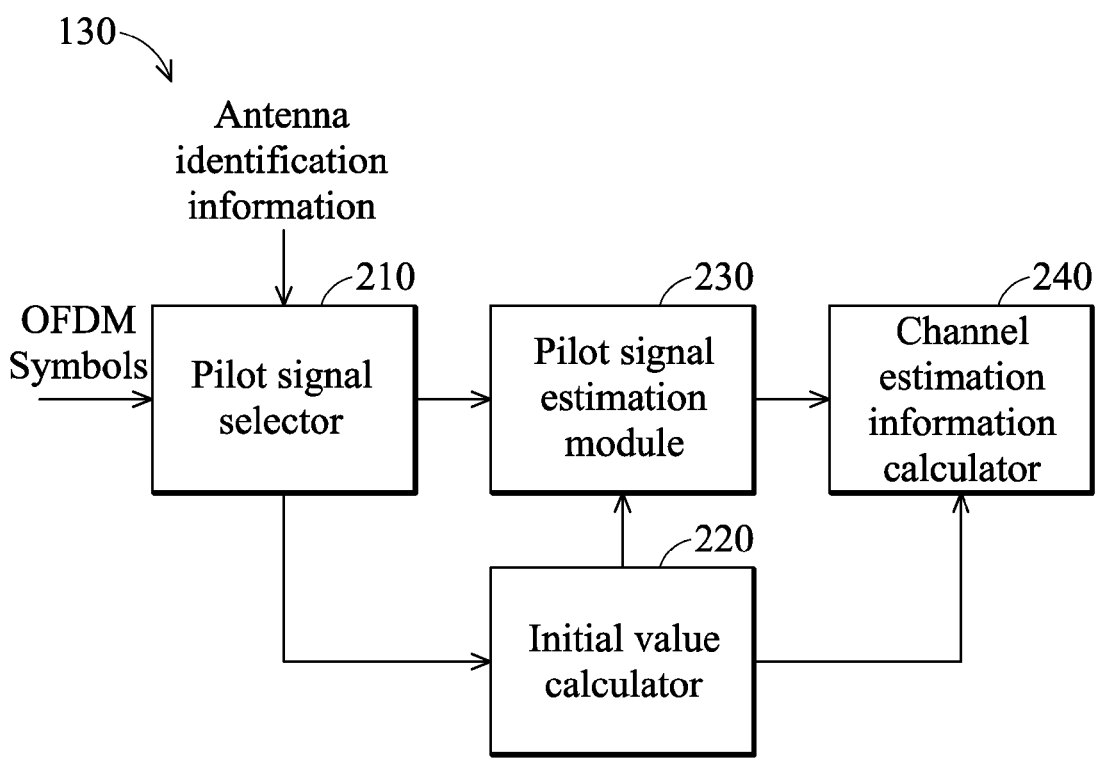
FIG. 2 shows the block diagram of the channel estimation module according to an embodiment of the invention.

FIG. 2 shows the block diagram of the channel estimation module 130 as shown in FIG. 1 according to an embodiment of the invention. The channel estimation module 130 comprises a pilot signal selector 210, an initial value calculator 220, a pilot signal estimation module 230 and a channel estimation information calculator 240. The pilot signal selector 210 respectively calculates the relating coefficients of a variable pilot set and a constant pilot set for the pilot signals, or calculates relating coefficients of the pilot signals as a whole according to the determination result of the OFDM pilot signal position and antenna type. For multiple transmitting antennas, the pilot signal selector 210 classifies the pilot signals corresponding to the same transmitting antenna as a pilot set.

The initial value calculator 220 receives the pilot signals from the pilot signal selector 210 and is coupled to the pilot signal estimation module 230. The initial value calculator 220 provides an initial value for channel estimation to the pilot signal estimation module 230. According to an embodiment of the invention, the initial value is calculated from the formula: $\hat{H}_p = Y/X$, wherein Y represents the received pilot signals and X represents the known transmitted pilot signals.

The pilot signal estimation module 230 estimates the correlation coefficients of the pilot signals in the time and frequency domains according the pilot set classification result generated by the pilot signal selector 210 and the initial value of channel estimation generated by the initial value calculator 220. The respective equations are as follows:

$$r_f(k-k') = \frac{\sin(\pi(k-k')\tau_{max}\Delta f)}{\pi(k-k')\tau_{max}\Delta f}; \quad (1)$$

$$r_t(l-l') = \frac{\sin(2\pi(l-l')f_{max}T)}{2\pi(l-l')f_{max}T}, \quad (2)$$

where k' and l' respectively represents the pilot signals in frequency and time domain directions, k and l respectively represents the required pilot or data signals index in frequency and time domain directions, $\tau_{max}$ represents the maximum time delay, $f_{max}$ represents the maximum Doppler frequency shift, $\Delta f$ represents the symbol spacing of the OFDM symbols, and T represents the OFDM symbol length.

The channel estimation information calculator 240 is coupled to the pilot signal estimation module 230, and generates the channel estimation information, according to the filter coefficients obtained from the pilot signal estimation module 230, via the function $$W = R\left(R + \frac{\beta}{SNR}I\right)^{-1},$$

to complete channel estimation, where β is a coefficient associated with the modulation technique, $\beta = E|X_k|^2 E|1/X_k|^2$, SNR represents the signal to noise ratio, I represents an identity matrix, R represents a correlation matrix, $R(k-k',l-l')=r_f(k-k')r_t(l-l')$, that is, R may be affected by 2D variables in both time and frequency domains.

In the following paragraphs, the operation modes of a Full Usage of Subchannels (FUSC), Partial Usage of Subchannels (PUSC) and PUSC using Space Time Coding (STC PUSC) in a Wimax system are described in combination with the embodiments of the invention.

Full Usage of Subchannels Operation Mode

In the Full Usage of Subchannels (FUSC) operation mode of the Wimax system, each sub-channel comprises sub-carriers spread over the whole spectrum. The transmitter may use all of the sub-channels to obtain maximum frequency diversity.

In the Full Usage of Subchannels (FUSC) operation mode, down link paths use all of the sub-channels. First, the pilot sub-carriers are assigned in the usable sub-carriers. Next, the remaining data sub-carriers are divided into sub-channels. Pilot signals may be divided into two variable pilot sets: VariableSet#0 and VariableSet#1, and two constant pilot sets: ConstantSet#0 and ConstantSet#1. Table 1 illustrates the pilot set numbers and positions in the Full Usage of Subchannels (FUSC) operation mode.

TABLE 1

1024 sub-carriers, and the pilot positions in the down link Full Usage of Subchannels (FUSC) operation mode

| Pilot signal | Value | Notes |
|---|---|---|
| VariableSet#0 | 36 | 0, 24, 48, 72, 96, 120, 144, 168, 192, 216, 240, 264, 288, 312, 336, 360, 384, 408, 432, 456, 480, 504, 528, 552, 576, 600, 624, 648, 672, 696, 720, 744, 768, 792, 816, 840 |
| ConstantSet#0 | 6 | 72 * (2 * n + k) + 9; where k = 0, n = 0~5, when the indexes of pilot sub-carriers are calculated according to the described equations, DC sub-carriers is allowed to be included. |
| VariableSet#1 | 35 | 0, 24, 48, 72, 96, 120, 144, 168, 192, 216, 240, 264, 288, 312, 336, 360, 384, 408, 432, 456, 480, 504, 528, 552, 576, 600, 624, 648, 672, 696, 720, 744, 768, 792, 816, 840 |
| ConstantSet#1 | 5 | 72 * (2 * n + k) + 9; where k = 1, n = 0~4, when the indexes of pilot sub-carriers are calculated according to the described equations, DC sub-carriers is allowed to be included. |

It can be seen in Table 1, that the constant position pilots belong to the constant pilot set. Meanwhile, the pilots satisfying the following equation may belong to a variable pilot set:

PilotsLocation=VariableSet#x+6·(FUSC_Symbol-Number mod 2)

According to the pilot signals as shown in Table 1, the initial estimation values of the variable pilot signals and constant pilot signals may be obtained according to the following formula: $\hat{H}_p = Y/X$, where Y represents the received pilot signals and X represents the known transmitted pilot signals.

Figure 3A:
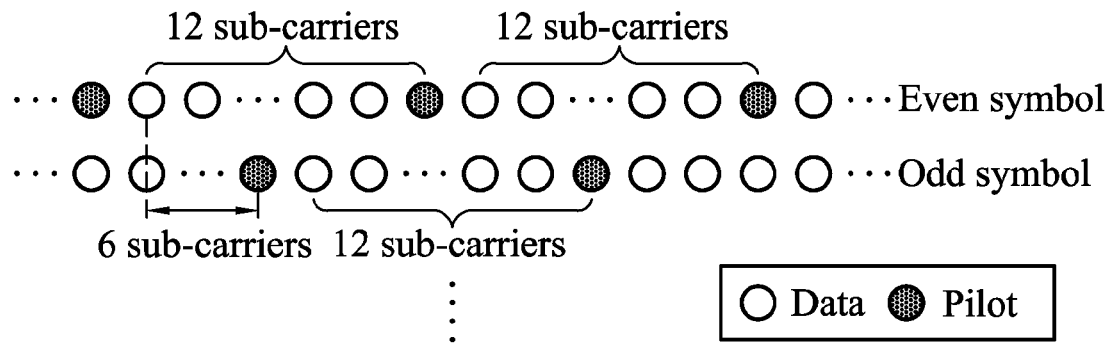
FIG. 3A shows a sketch of constant position pilots and variable position pilots of a single transmitting and a single receiving antenna operated in the Full Usage of Subchannels (FUSC) mode of a Wimax system according to an embodiment of the invention.

FIG. 3A shows a sketch of variable position pilots of a single transmitting and a single receiving antenna operated in the Full Usage of Subchannels (FUSC) mode of a Wimax system. It can be seen that in the variable position pilot set, the pilot signals for each two adjacent symbols are spaced by 6 sub-carriers, and the pilot signals for the same symbols are spaced by 12 sub-carriers. That is, the minimum pilot space between an odd symbol and an even symbol is 6 sub-carriers as shown in FIG. 3A, and the pilot space between adjacent symbols for both odd symbols and even symbols is 12 sub-carriers. It is to be noted that in other embodiments, the pilot space may use other designs.

Figure 3B:
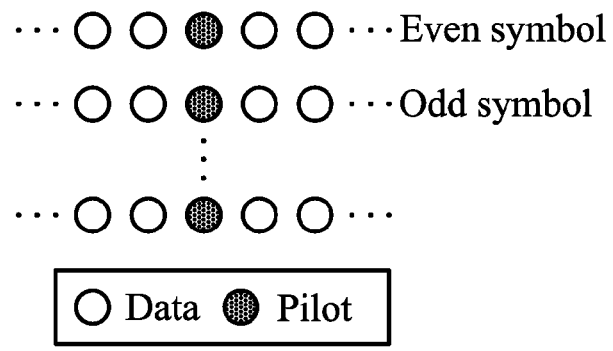
FIG. 3B shows a sketch of constant position pilots in the Full Usage of Subchannels (FUSC) mode according to an embodiment of the invention.

FIG. 3B shows a sketch of constant position pilots in the Full Usage of Subchannels (FUSC) mode. It can be seen that the pilot signals of even symbols and odd symbols are placed at the same position. It can be seen that the pilots are distributed in the same positions in the odd symbols and even symbols.

Figure 4:
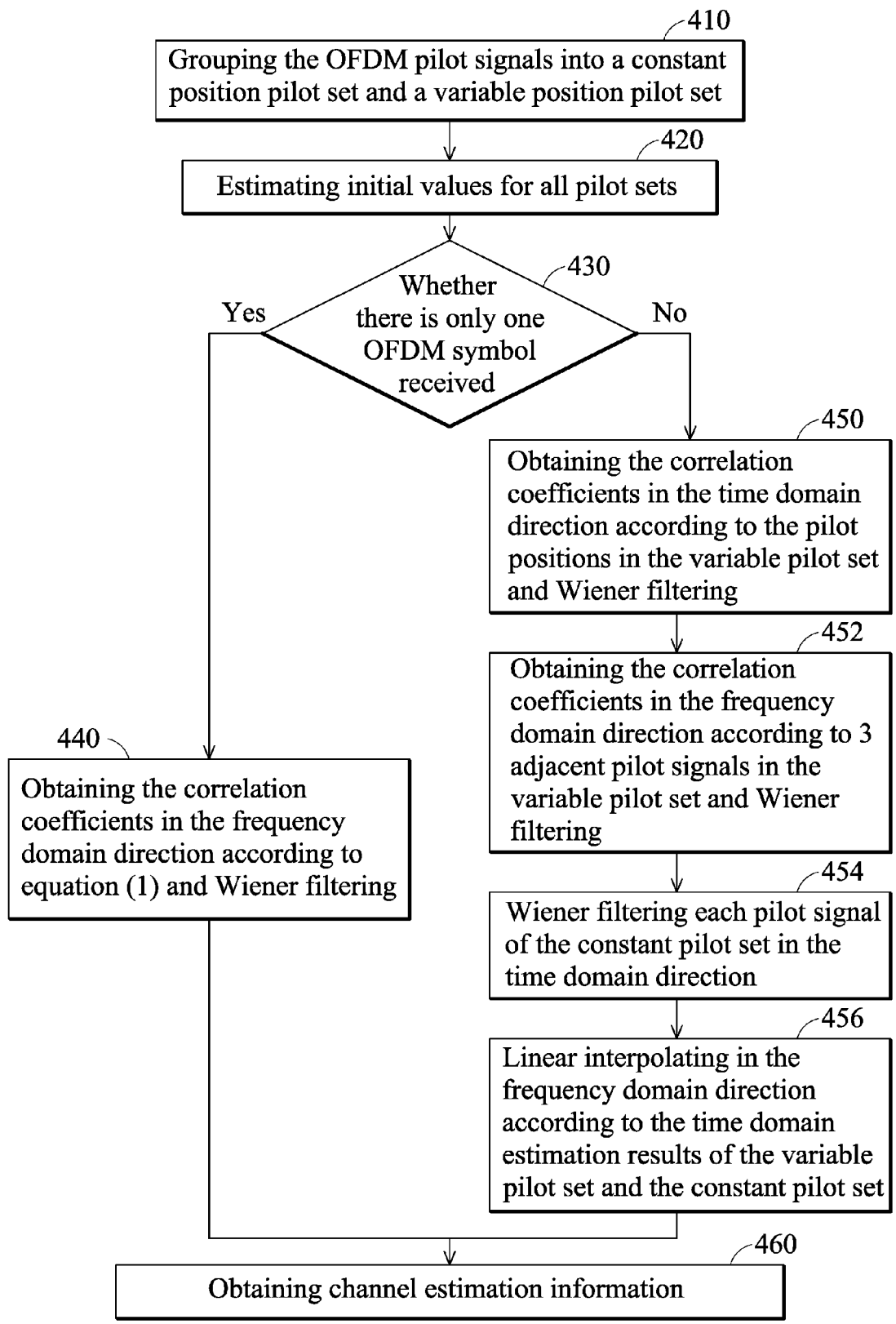
FIG. 4 shows a flow chart of the channel estimation method by using the received OFDM symbols in the Wimax Full Usage of Subchannels (FUSC) mode according to an embodiment of the invention.

FIG. 4 shows a flow chart of the channel estimation method by using the received OFDM symbols in the Wimax Full Usage of Subchannels (FUSC) mode according to an embodiment of the invention. In step S410, OFDM pilot signals are grouped into a constant position pilot set and a variable position pilot set according to their sequentially appeared positions. The pilot signal positions are shown in FIG. 3A and FIG. 3B. According to an embodiment of the invention, the separated data storage address method is used. The grouping method as shown in Table 1 may be used to group the pilot signals. It is to be noted that other grouping methods may be designed according to the pilot properties and the invention should not be limited thereto.

In step 420, initial values of all of the described pilot sets, including the constant position pilot set and variable position pilot set, are estimated. According to an embodiment of the invention, a least square (LS) algorithm is used, that is, the initial values of the pilot signals is obtained according to the following formula: $\hat{H}_p = Y/X$, where Y represents the received pilot signals and X represents the known transmitted pilot signals.

It can be seen that in the embodiment of the invention, the constant position pilot set and variable position pilot set are identified first and then initial values are estimated. Meanwhile according to another embodiment of the invention, step 420 also may be performed prior to step 410 and the invention should no be limited thereto.

In step 430, the number of received OFDM symbols is determined. When there is only one OFDM symbol received, the process goes to step 440. Since there is only one OFDM symbol received, there is no need to perform time domain filtering. For an OFDM symbol, the pilots are spaced by 12 sub-carriers. Thus, the correlation coefficients may be obtained according to equation (1) and Wiener filtering.

When there are multiple successive OFDM symbols received, the process goes to step 450. In step 450, correlation coefficients in the time domain direction may be obtained according to the variable pilot set and the received signal may further be filtered, where an order 1 Wiener filter is used.

In step 452, the correlation coefficient calculation and filtering in the frequency domain direction are performed on the same sub-carrier positions of two variable pilot sets. Three pilot signals, including the adjacent pilot signals and the original pilot itself, may be used for calculation. It is to be noted that the selection of the pilot signals in the frequency domain direction is an example of an embodiment of the invention and other number of pilot signals may also be used to calculate the correlation coefficients. The invention should not be limited thereto.

In step 454, the pilot signal in each position of the constant pilot set is Wiener filtered in the time domain direction.

In step 456, the estimation results of the sub-carriers in other positions are obtained by linear interpolation. According to the embodiment of the invention, since the channel estimation speed may be improved with sufficient accuracy when using linear interpolation, it is to be understood that in other embodiments, Wiener filtering in frequency domain direction to obtain estimation results may also be performed. Meanwhile, it is to be understood that the described steps are made for the purpose of illustrating the general principles of the invention and should not be taken in a limiting sense. For one with ordinary skill in the art, performing estimation in the frequency domain direction prior to performing estimation in the time domain direction is also included within the scope of the invention.

In step 460, channel estimation information of all required subcarriers is obtained according to the results in step 440 or step 456, where a union of the correlation coefficients for different pilot set comprises the correlation coefficients of all pilot signals. The channel estimation information W is obtained according to the correlation coefficients of all pilot signals, and the actual transmitted signals are further obtained. For descriptions related to calculating channel estimation information W, please refer to related descriptions of the channel estimation information calculator 240 as shown in FIG. 2.

Figure 5:
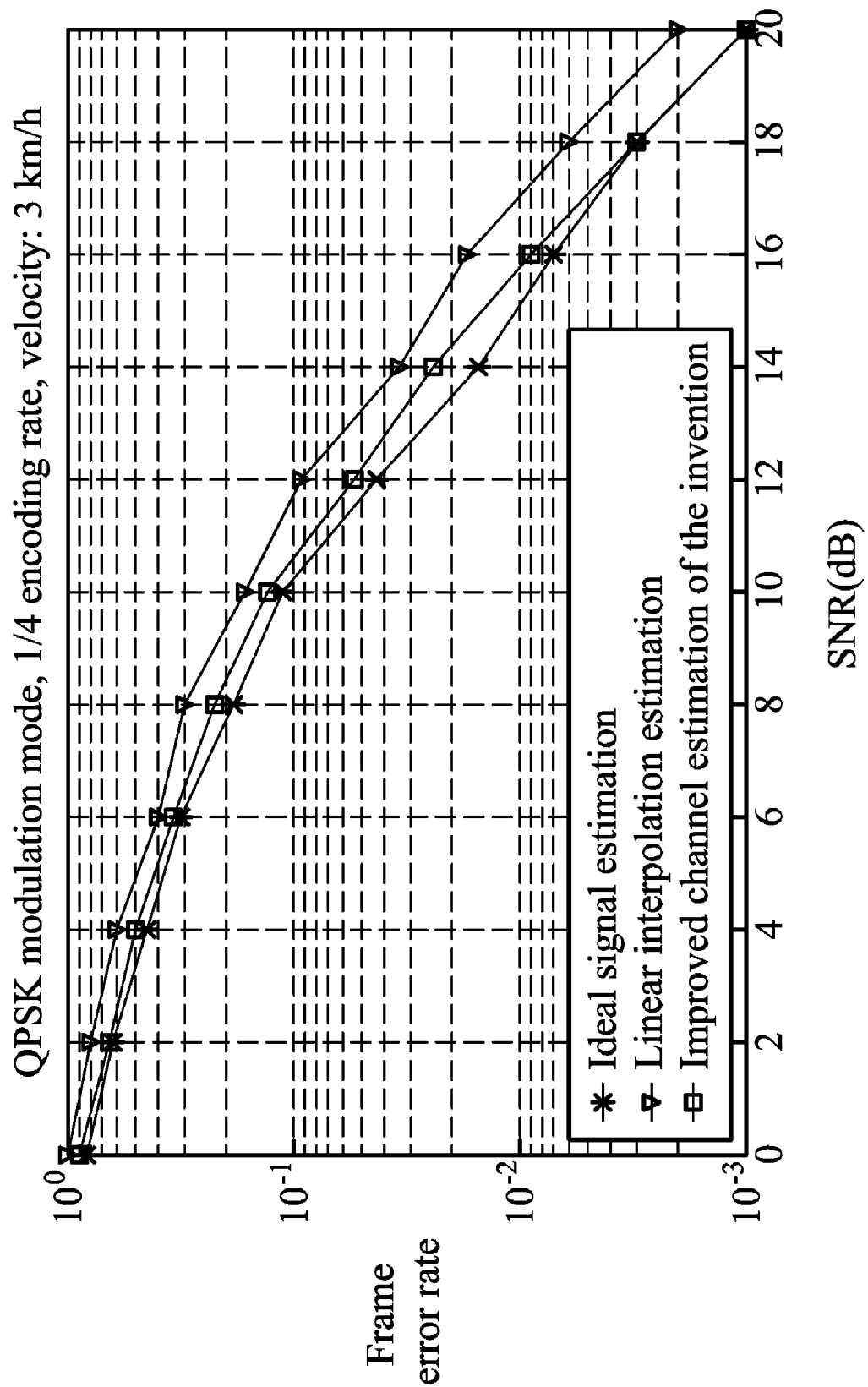
FIG. 5 shows the channel estimation simulation results according to an embodiment of the invention.

FIG. 5 shows channel estimation simulation results for conventional linear filtering, improved Wiener filtering of the invention, and ideal conditions when receiving 8 successive OFDM symbols that are encoded by a QPSK with a ¼ code rate and mobility of 3 km/h in an Full Usage of Subchannels (FUSC) mode, where the horizontal axis represents SNR in dB, and the vertical axis represents frame error rate. It can be seen that the improved Wiener filtering greatly reduces computation cost and time, and improves estimation results.

Partial Usage of Subchannels of a Single Antenna

In the Partial Usage of Subchannels (PUSC) operation mode, the transmitter uses a portion of the sub-channels so as to implement partial frequency reuse.

An application for when the OFDM system operates in a Partial Usage of Subchannels (PUSC) mode is illustrated here as an embodiment of the invention. In the Partial Usage of Subchannels (PUSC) mode, the sub-carriers are grouped into several interleaved clusters, where each cluster comprises 14 adjacent sub-carriers. The Partial Usage of Subchannels (PUSC) mode may be used in multi-sector conditions, wherein the cluster number in each sector of a cellular is limited.

According to the embodiment of the invention, each data block comprises a plurality of successive OFDM symbols in time domain, and every 14 sub-carriers in the frequency domain are grouped into a cluster. Since each cluster has limited length in the frequency domain, improvement in the frequency domain direction is restricted. Thus, the improved calculation is only preformed in the time domain direction. As to the frequency domain direction, the linear interpolation function is still introduced to perform estimation on other sub-carriers. Thus, little performance is sacrificed by greatly reducing computation complexity.

Figure 6:
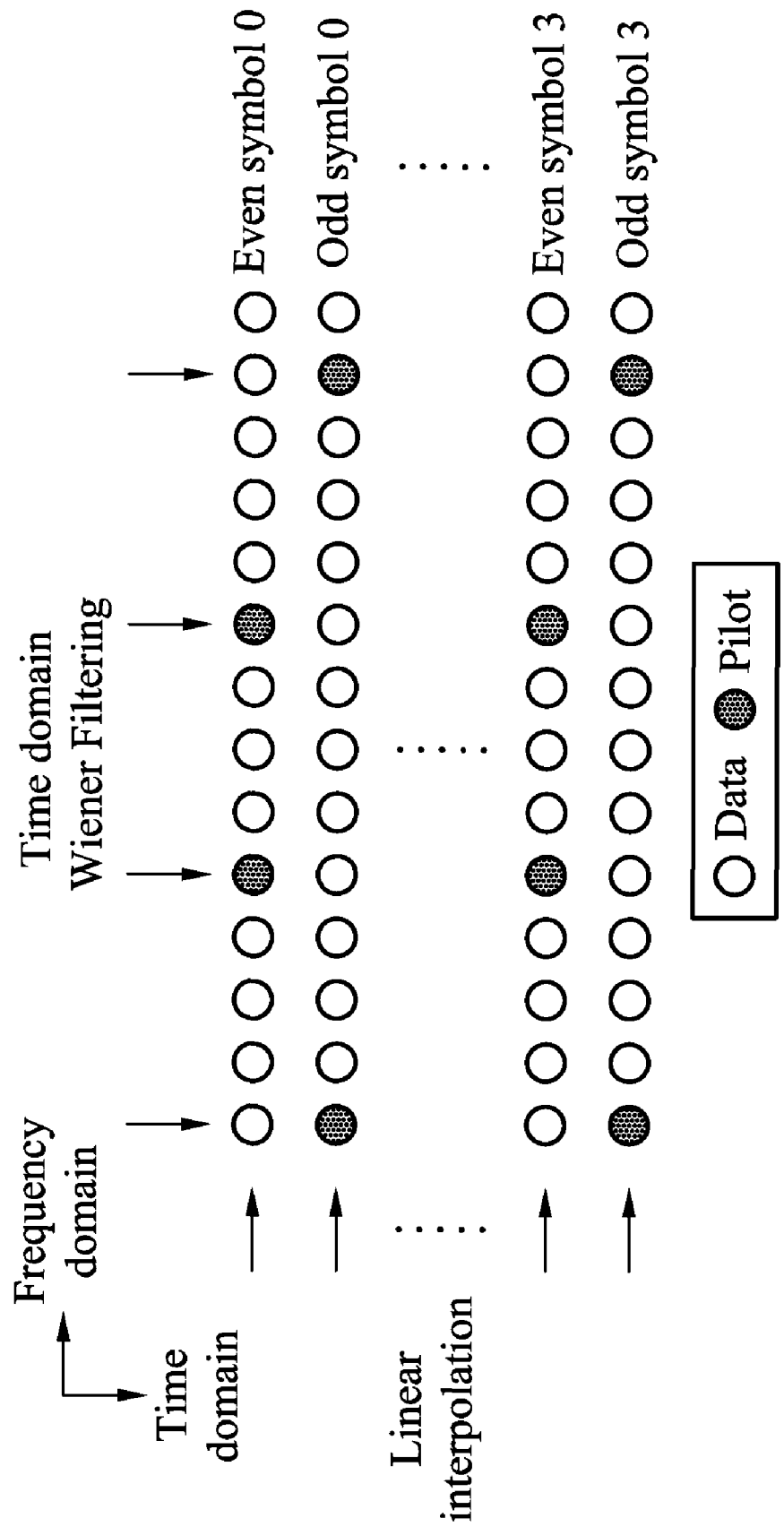
FIG. 6 shows a sketch of pilot positions in a cluster of a single transmitting and a single receiving antenna in a Partial Usage of Subchannels (PUSC) mode according to an embodiment of the invention.

FIG. 6 shows a sketch of pilot positions in a cluster of a single transmitting and a single receiving antenna in a Partial Usage of Subchannels (PUSC) mode. It can be seen that in the Partial Usage of Subchannels (PUSC) mode, there is no need to differentiate between a constant pilot set and a variable pilot set.

Figure 7:
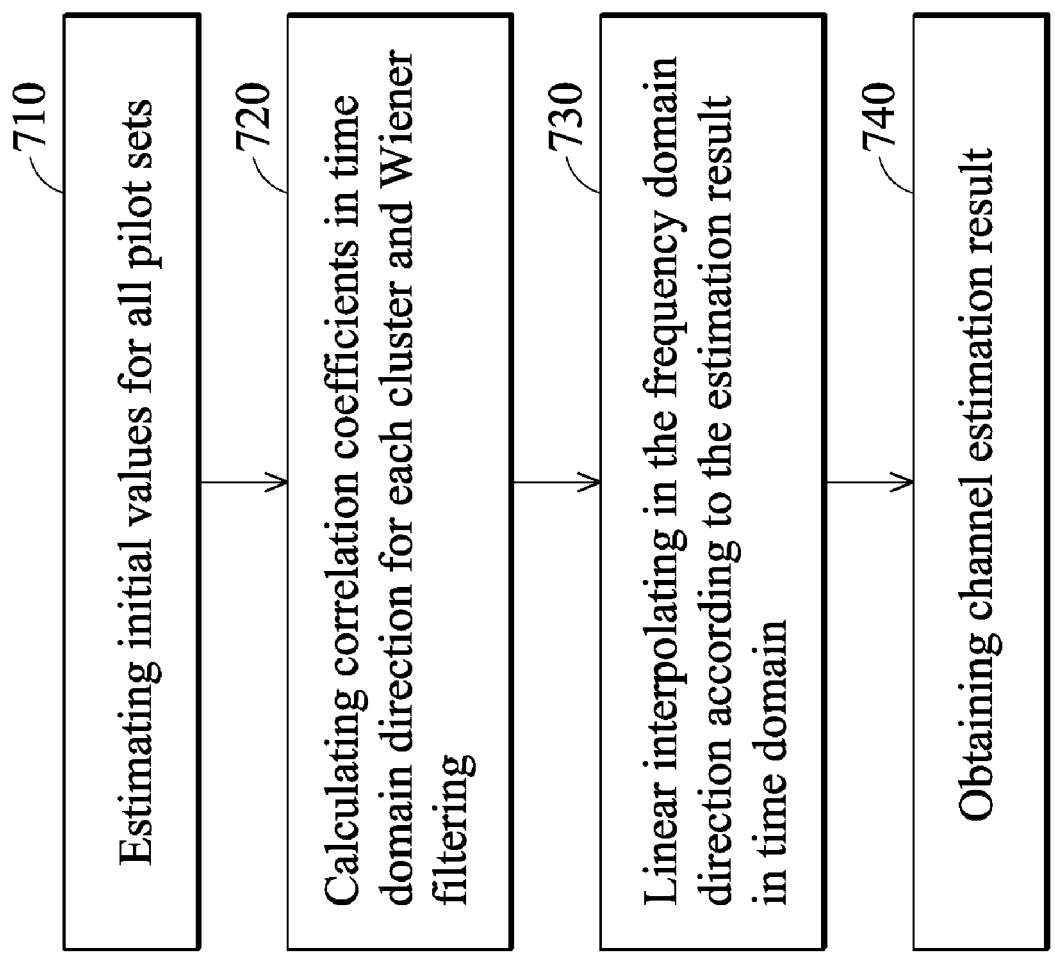
FIG. 7 shows a flow chart of the method in a Partial Usage of Subchannels (PUSC) mode according to an embodiment of the invention.

FIG. 7 shows a flow chart of the method in a Partial Usage of Subchannels (PUSC) mode according to an embodiment of the invention. The function in step 710 is similar to that of step 420 in the Full Usage of Subchannels (FUSC) mode and is omitted here for brevity. In step 720, the correlation coefficients for each cluster are calculated in a time domain direction and then order 1 Wiener filtering is performed. In step 730, since there are 4 sub-carriers spaced between adjacent pilots, the linear interpolation function is regarded as being enough for the accuracy requirement in the frequency domain direction. In this manner, the correlation coefficients may be simplified as the following equation: $R(l-l')=r_t(l-l')$. It is to be noted that there are also some other number of sub-carriers spaced between pilots. When the pilot space number is too small to perform correlation coefficient calculation in the time domain direction, the correlation coefficient calculation in the frequency domain direction may be performed. In step 740, channel estimation information is obtained according to step 730. The method for obtaining channel estimation information is similar to the previously described method in the Full Usage of Subchannels (FUSC) mode as shown in FIG. 4 and is omitted here for brevity.

Figure 8:
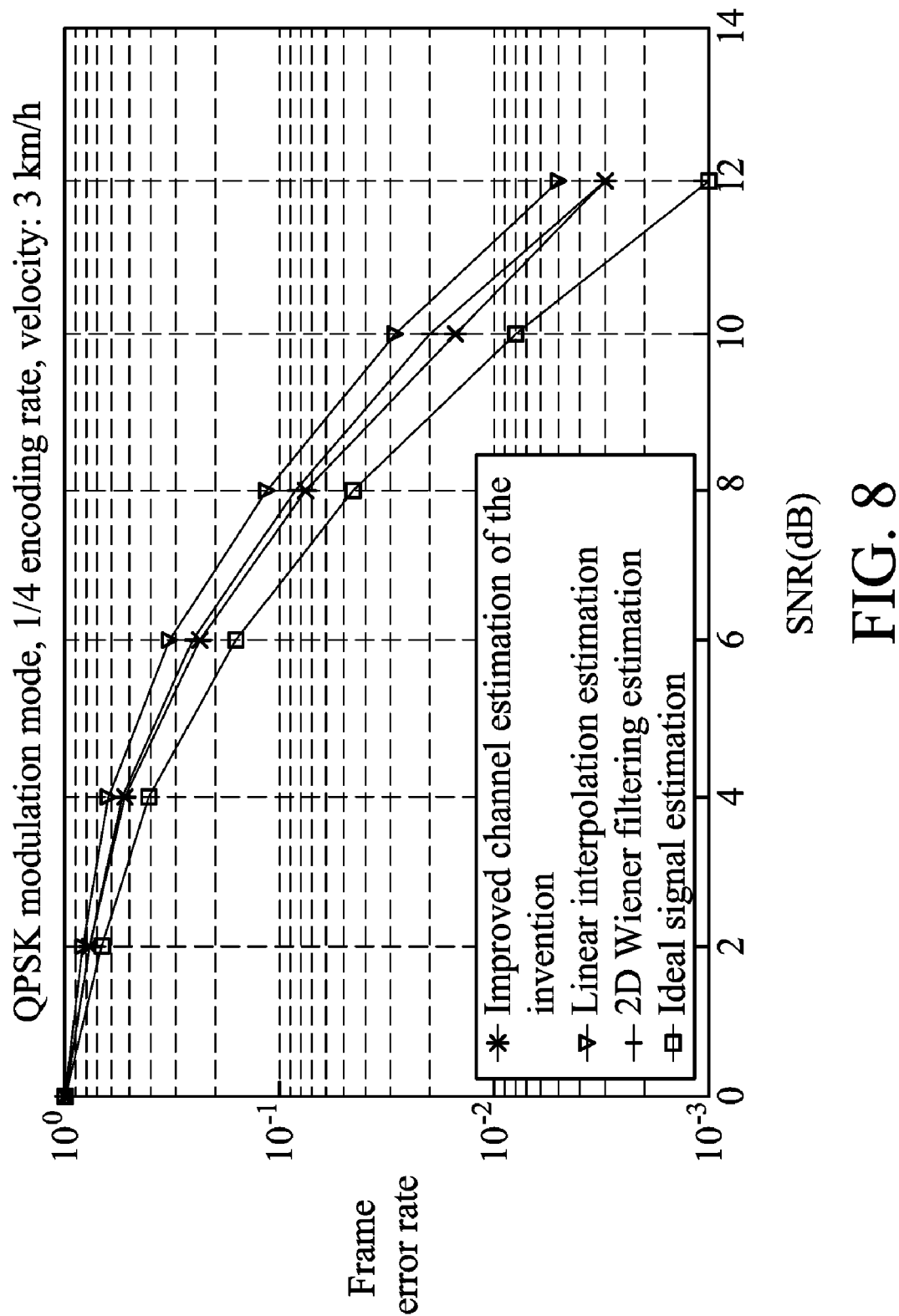
FIG. 8 shows the channel estimation simulation results according to an embodiment of the invention.

FIG. 8 shows channel estimation simulation results for conventional 2D Wiener filtering, improved Wiener filtering of the invention, and ideal conditions when receiving 8 successive OFDM symbols that are encoded by a QPSK with a ¼ code rate and mobility of 3 km/h in a Partial Usage of Subchannels (PUSC) mode, where the horizontal axis represents SNR in dB, and the vertical axis represents frame error rate. It can be seen that the improved Wiener filtering greatly reduces computation cost and computation time, while achieving better estimation results.

PUSC using Space Time Coding (STC PUSC)

In the STC PUSC mode, the antenna array is usually configured as multiple transmitting and multiple receiving antennas. Input information is first grouped with k symbols [C1, C2, . . . Ck]. After being space time encoded, in two symbol periods, multiple antennas simultaneously transmit k symbols. During the first period, the first antenna transmits symbol C1, the second antenna transmits symbol C2 . . . and the k-th antenna transmits symbol CK. During the second period, the first antenna transmits symbol −C2*, the second antenna transmits symbol C1* . . . and the k-th antenna transmits symbol CK*, where * represents complex conjugate. It is believed that the channel condition is usually unchanged in the time direction within one period.

Figure 9A:
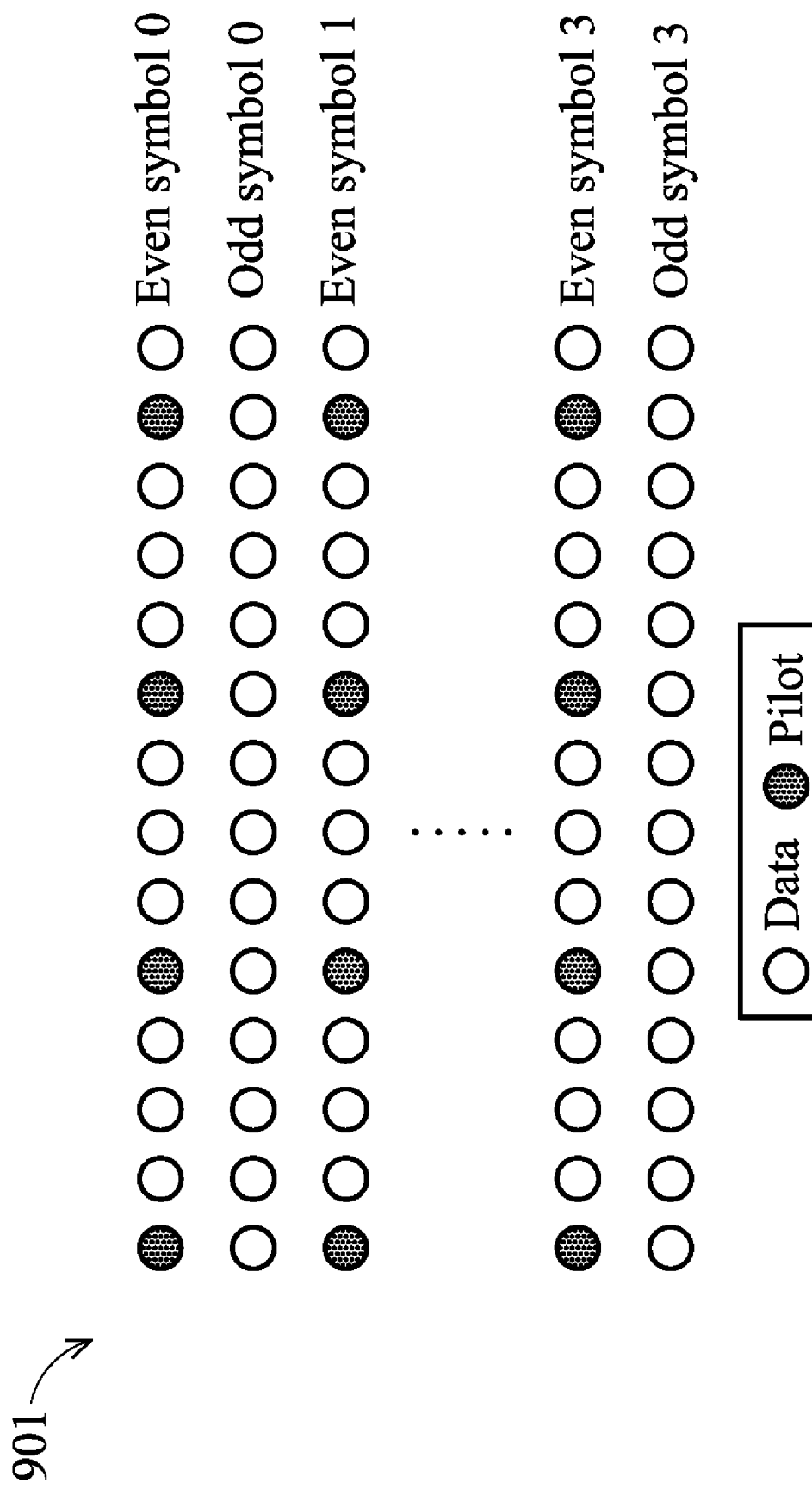
FIG. 9A and FIG. 9B illustrate the pilot signal positions in the received OFDM symbol in the STC PUSC mode according to an embodiment of the invention.
Figure 9B:
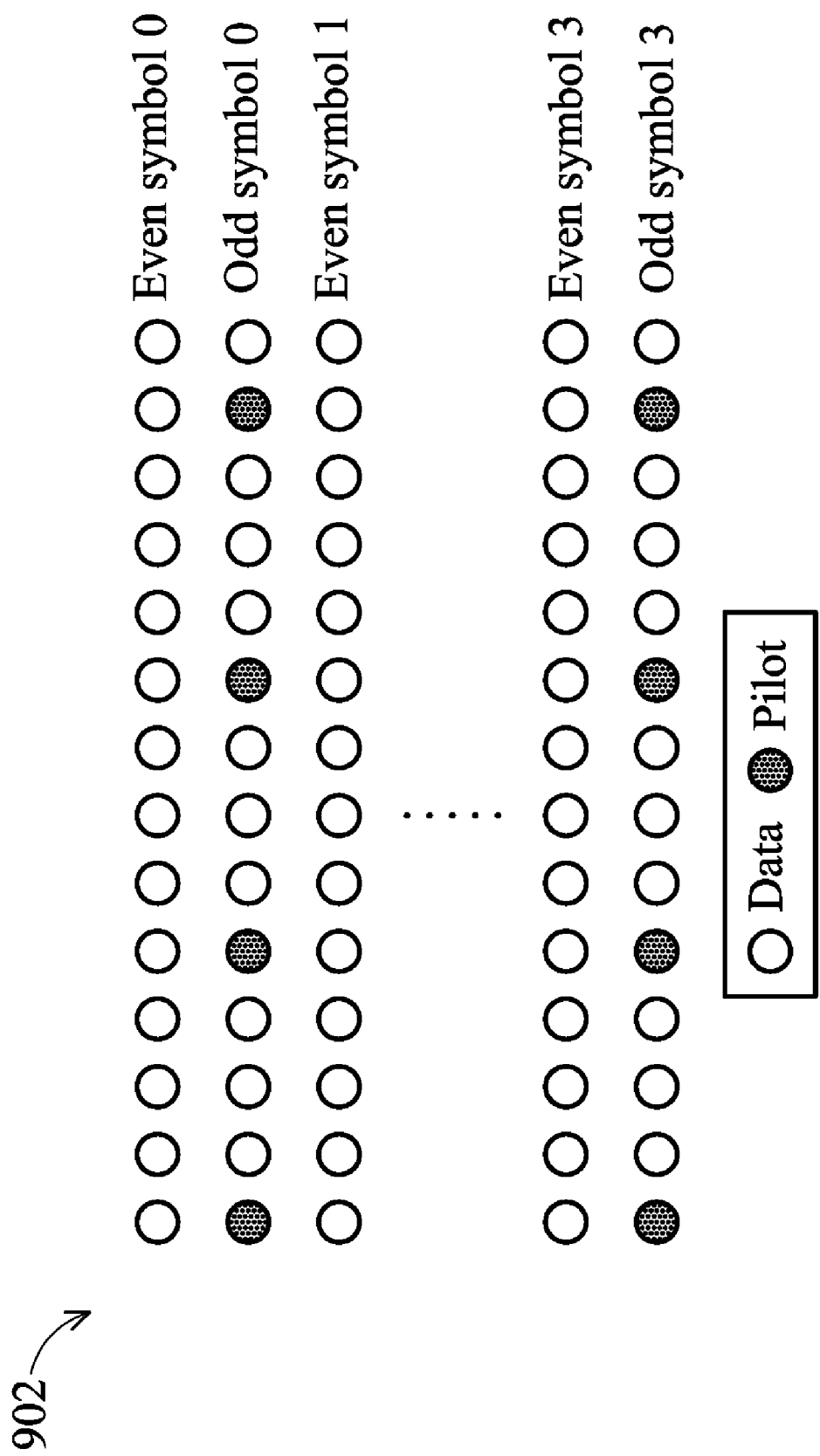

According to an embodiment of the invention, two antennas are used for receiving data. Such kind of antenna array setting is made for the purpose of illustrating the invention in the following paragraphs. FIGS. 9A and 9B illustrate the pilot signal positions in the received OFDM symbol in the STC PUSC mode. In FIGS. 9A and 9B, in each position, there are two pilot signals 901 and 902 respectively received from two different antennas, where pilot 901 is received from antenna 0 and pilot 902 is received from antenna 1. The pilot variation period is 4 symbols. Thus, in the STC PUSC mode, the pilot space of the pilot signals received from the same antenna is larger. When 2D Wiener filtering is adopted, more OFDM symbols may be required in an operation.

Figure 10:
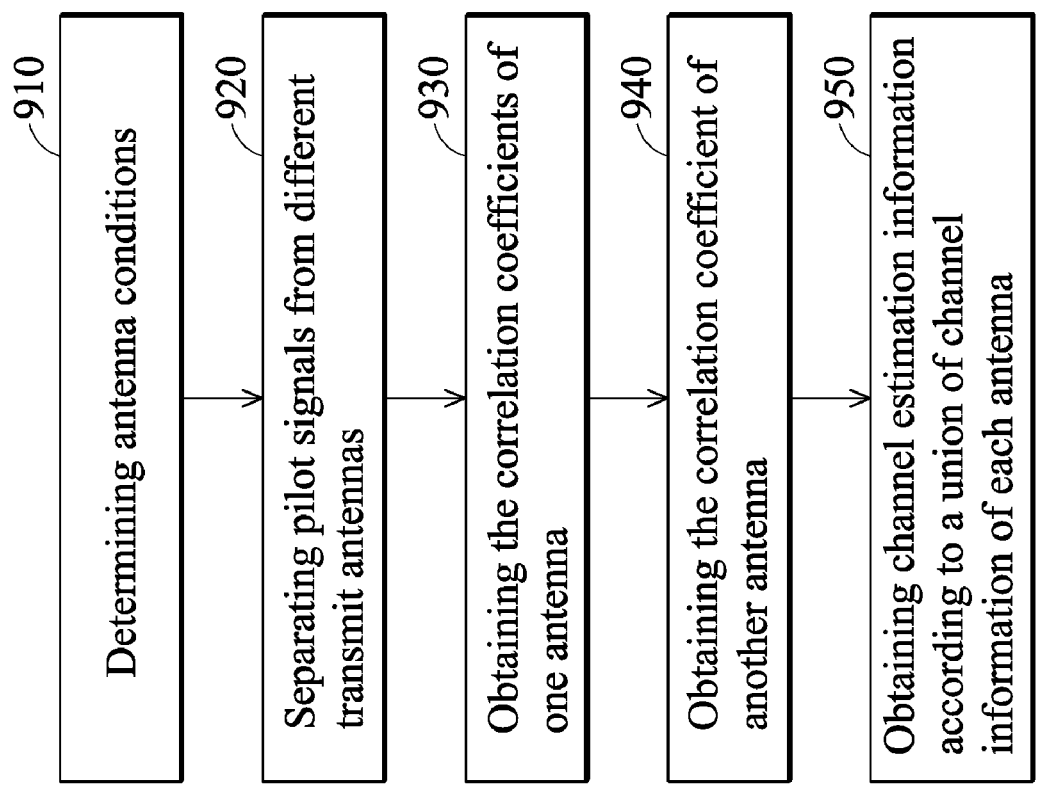
FIG. 10 shows a flow chart of the method according to an embodiment of the invention.

FIG. 10 shows a flow chart of the method according to an embodiment of the invention. In step 910, the antenna receiving module 110 as shown in FIG. 1 determines the antenna conditions, including the parameters about transmitting/receiving antenna numbers, data allotment rule . . . etc. In the embodiment of the invention, two transmitting antennas are used. Thus, the single antenna sign bit is set as false. In step 920, pilot signals from different transmit antennas are separated. In step 930, correlation coefficients on one antenna are calculated. It is to be noted that in other embodiments of the invention, the method as illustrated in FIG. 4 and FIG. 7 may also be used to obtain the correlation coefficient. In step 940, the calculation of the correlation coefficient W2 is also performed on the other antenna. Steps 930 and 940 may be performed at the same time. In step 950, according to the obtained correlation coefficients W1 and W2, 2D filtering is performed to obtain channel estimation information.

Figure 11:
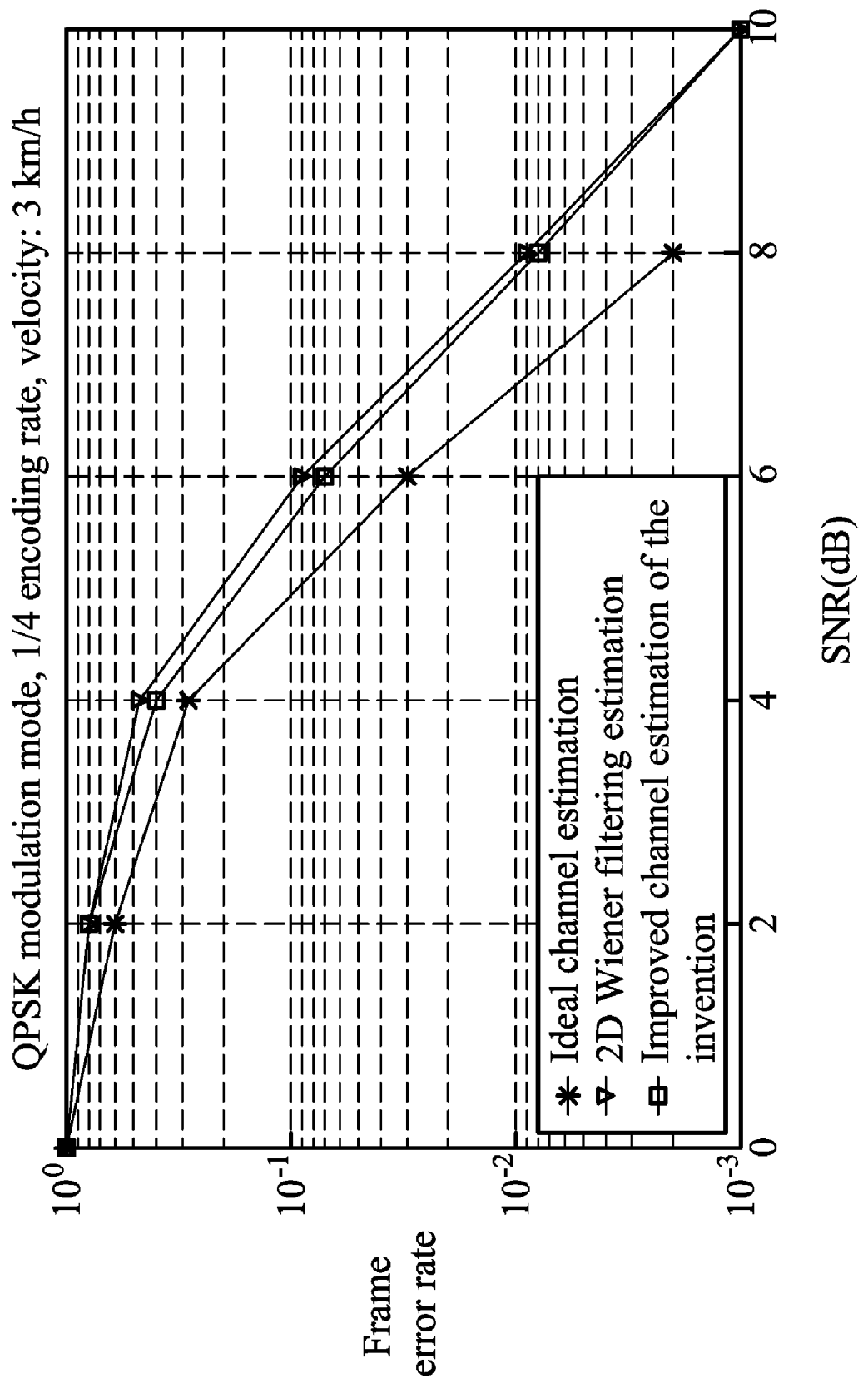
FIG. 11 shows channel estimation simulation results according to an embodiment of the invention.

FIG. 11 shows channel estimation simulation results for conventional 2D Wiener filtering, improved Wiener filtering of the invention, and ideal condition when receiving 8 successive OFDM symbols that are encoded by a QPSK with a ¼ code rate and mobility of 3 km/h in an STC PUSC mode, where the horizontal axis represents SNR in dB, and the vertical axis represents frame error rate. The improved Wiener filtering greatly reduces computation cost and computation time, while achieving better estimation results.

While the invention has been described by way of example and in terms of preferred embodiment, it is to be understood that the invention is not limited thereto. Those who are skilled in this technology can still make various alterations and modifications without departing from the scope and spirit of this invention. Therefore, the scope of the present invention shall be defined and protected by the following claims and their equivalents.

What is claimed is:

1. A channel estimation method in an orthogonal frequency division multiplexing (OFDM) system for receiving a plurality of OFDM symbols and generating channel estimation information, comprising:
   obtaining a portion of pilot signals from a plurality of pilot signals as a first pilot set according to corresponding positions of the pilot signals in the OFDM symbols, wherein spacing between each pilot signal in the first pilot set is a first relative position;
   estimating a first estimation factor by calculating correlation coefficients of the pilot signals in the first pilot set in a first direction to obtain the first estimation factor, estimating a second estimation factor by calculating the pilot signals in the first pilot set in a second direction to obtain the second estimation factor, and obtaining a pilot signal estimation result according to the first estimation factor and the second estimation factor; and
   obtaining the channel estimation information according to the pilot signal estimation result,
      wherein at least one step of the method is performed by at least one hardware processor.

2. The channel estimation method as claimed in claim 1, wherein the first estimation factor is obtained by calculating the entire pilot signals of the first direction in the first pilot set, and the second estimation factor is obtained by calculating a limited number of the pilot signals of the second direction in the first pilot set.

3. The channel estimation method as claimed in claim 1, wherein a union of the first estimation factor and the second estimation factor is the pilot signal estimation result.

4. The channel estimation method as claimed in claim 1, wherein when the pilot signals are obtained as the first pilot set, and the OFDM system is operated in a Partial Usage of Subchannels (PUSC) mode of a Worldwide Interoperability for Microwave Access (Wimax) system.

5. The channel estimation method as claimed in claim 1, further comprising:
   obtaining another portion of the pilot signals as a second pilot set, wherein spacing between each pilot signal in the second pilot set is a second relative position, and wherein the first relative position is different from the second relative position; and
   estimating a third estimation factor by calculating the pilot signals in the second pilot set in the first direction to obtain the third estimation factor and estimating a fourth estimation factor by calculating the pilot signals in the second pilot set in the second direction to obtain the fourth estimation factor, wherein a union of the first, the second, the third and the fourth estimation factors is the pilot signal estimation result.

6. The channel estimation method as claimed in claim 5, wherein the channel estimation information is obtained by Wiener filtering according to the pilot signal estimation result.

7. The channel estimation method as claimed in claim 5, wherein when the pilot signals are grouped into the first pilot set and the second pilot set, the OFDM system is operated in a Full Usage of Subchannels (FUSC) mode of a Worldwide Interoperability for Microwave Access (Wimax) system.

8. The channel estimation method as claimed in claim 1, further comprising:
   obtaining another portion of the pilot signals as a second pilot set, wherein spacing between each pilot signal in the second pilot set is a second relative position, and wherein the first relative position is different from the second relative position; and
   estimating a third estimation factor by calculating entire pilot signals of the first direction in the second pilot set, and estimating a fourth estimation factor by calculating the pilot signals of the second direction in the second pilot set according to the first estimation factor and the third estimation factor, wherein the fourth estimation factor is estimated by linear interpolation and wherein a union of the first, the second, the third and the fourth estimation factors is the pilot signal estimation result.

9. The channel estimation method as claimed in claim 2, wherein the step of estimating the estimation factor is performed by Wiener filtering a plurality of sub-carriers and the pilot signals in the OFDM symbols.

10. The channel estimation method as claimed in claim 1, wherein the channel estimation information obtained according to the pilot signal estimation result satisfies the formula: $W=R(R+K)^{-1}$, wherein W represents the channel estimation information, R represents the correlation coefficients result and K is a constant.

11. The channel estimation method as claimed in claim 1, further comprising:
   estimating a plurality of initial values of the pilot signals, wherein the initial values are proportional to the received pilot signals, and inversely proportional to known transmitted pilot signals.

12. A channel estimation apparatus used in an Orthogonal frequency division multiplexing (OFDM) system for receiving a plurality of OFDM symbols and generating channel estimation information, comprising:
   a pilot signal selector obtaining a portion of pilot signals from a plurality of pilot signals as a first pilot set according to corresponding positions of the pilot signals in the OFDM symbols, wherein spacing between each pilot signal in the first pilot set is a first relative position;
   a pilot signal estimation module coupled to the pilot signal selector, estimating a first estimation factor by calculating correlation coefficients of the pilot signals in the first pilot set in a first direction to obtain the first estimation factor, estimating a second estimation factor by calculating the pilot signals in the first pilot set in a second direction to obtain the second estimation factor, and obtaining a pilot signal estimation result according to the first estimation factor and the second estimation factor; and a channel estimation information calculator coupled to the pilot signal estimation module and obtaining the channel estimation information according to the pilot signal estimation result.

13. The channel estimation apparatus as claimed in claim 12, wherein the first estimation factor estimated by the pilot signal estimation module is obtained by calculating the entire pilot signals of the first direction in the first pilot set, and the second estimation factor estimated by the pilot signal estimation module is obtained by calculating a limited number of the pilot signals of the second direction in the first pilot set.

14. The channel estimation apparatus as claimed in claim 12, wherein a union of the first estimation factor and the second estimation factor estimated by the pilot signal estimation module is the pilot signal estimation result.

15. The channel estimation apparatus as claimed in claim 12, wherein when the pilot signal selector obtains the pilot signals as the first pilot set, the OFDM system is operated in a Partial Usage of Subchannels (PUSC) mode of a Worldwide Interoperability for Microwave Access (Wimax) system.

16. The channel estimation apparatus as claimed in claim 12, wherein the pilot signal selector further obtains another portion of the pilot signals as a second pilot set, wherein spacing between each pilot signal in the second pilot set is a second relative position, and wherein the first relative position is different from the second relative position, and wherein the pilot signal estimation module estimates a third estimation factor by calculating the pilot signals in the second pilot set in the first direction to obtain the third estimation factor and estimates a fourth estimation factor by calculating the pilot signals in the second pilot set in the second direction to obtain the fourth estimation factor.

17. The channel estimation apparatus as claimed in claim 16, wherein a union of the first, the second, the third and the fourth estimation factors is the pilot signal estimation result.

18. The channel estimation apparatus as claimed in claim 16, wherein when the pilot signal selector groups the pilot signals into the first pilot set and the second pilot set, the OFDM system is operated in a Full Usage of Subchannels (FUSC) mode of a Worldwide Interoperability for Microwave Access (Wimax) system.

19. The channel estimation apparatus as claimed in claim 12, wherein the pilot signal selector further obtains another portion of the pilot signals as a second pilot set, wherein spacing between each pilot signal in the second pilot set is a second relative position, and wherein the first relative position is different from the second relative position, and wherein the pilot signal estimation module estimates a third estimation factor by calculating entire pilot signals of the first direction in the second pilot set, and estimates a fourth estimation factor by calculating the pilot signals of the second direction in the second pilot set according to the first estimation factor and the third estimation factor, wherein the fourth estimation factor is estimated by linear interpolation and wherein a union of the first, the second, the third and the fourth estimation factors is the pilot signal estimation result.

20. The channel estimation apparatus as claimed in claim 13, wherein the estimation is performed by Wiener filtering a plurality of sub-carriers and the pilot signals in the OFDM symbols.

21. The channel estimation apparatus as claimed in claim 12, wherein the channel estimation information obtained according to the pilot signal estimation result satisfies the formula: $W=R(R+K)^{-1}$, wherein W represents the channel estimation information, R represents the correlation coefficients and K is a constant.

22. A receiving apparatus used in an Orthogonal frequency division multiplexing (OFDM) system, comprising:
a front end processing module for converting received signals to a plurality of OFDM symbols;
a channel estimation device receiving the OFDM symbols and generating channel estimation information, wherein the channel estimation device comprises:
a pilot signal selector obtaining a portion of pilot signals from a plurality of pilot signals as a first pilot set according to corresponding positions of the pilot signals in the OFDM symbols, wherein spacing between each pilot signal in the first pilot set is a first relative position;
a pilot signal estimation module coupled to the pilot signal selector, estimating a first estimation factor by calculating correlation coefficients of the pilot signals in the first pilot set in a first direction to obtain the first estimation factor, estimating a second estimation factor by calculating the pilot signals in the first pilot set in a second direction to obtain the second estimation factor, and obtaining a pilot signal estimation result according to the first estimation factor and the second estimation factor; and
a channel estimation information calculator coupled to the pilot signal estimation module and obtaining the channel estimation information according to the pilot signal estimation result; and
a back end processing module for decoding data according to the channel estimation information and the OFDM symbols.

* * * * *